(12) United States Patent
Chagny

(10) Patent No.: US 10,938,159 B2
(45) Date of Patent: Mar. 2, 2021

(54) DEVICE FOR AUTOMATICALLY DECOUPLING A CONNECTOR INSERTED IN A SOCKET OF AN ELECTRIC VEHICLE

(71) Applicant: ALSTOM Transport Technologies, Saint-Ouen (FR)

(72) Inventor: Christian Chagny, Saint Ouen (FR)

(73) Assignee: ALSTOM TRANSPORT TECHNOLOGIES, Saint-Ouen (FR)

( * ) Notice: Subject to any disclaimer, the term of this patent is extended or adjusted under 35 U.S.C. 154(b) by 0 days.

(21) Appl. No.: 16/594,407

(22) Filed: Oct. 7, 2019

(65) Prior Publication Data

US 2020/0112127 A1    Apr. 9, 2020

(30) Foreign Application Priority Data

Oct. 8, 2018    (FR) ...................... 18 59288

(51) Int. Cl.
| | |
|---|---|
| *H01R 13/62* | (2006.01) |
| *H01R 13/635* | (2006.01) |
| *B60L 53/16* | (2019.01) |
| *G08C 17/00* | (2006.01) |
| *H02J 7/00* | (2006.01) |

(52) U.S. Cl.
CPC ............ *H01R 13/635* (2013.01); *B60L 53/16* (2019.02); *G08C 17/00* (2013.01); *H02J 7/0045* (2013.01); *B60Y 2200/91* (2013.01); *B60Y 2300/91* (2013.01); *H01R 2201/26* (2013.01)

(58) Field of Classification Search
CPC .............. H01R 13/635; H01R 2201/26; H01R 13/665; B60L 53/16; G08C 17/00; H02J 7/0045; B60Y 2200/91; B60Y 2300/91

USPC ........................................................ 439/159
See application file for complete search history.

(56) References Cited

U.S. PATENT DOCUMENTS

| | | | |
|---|---|---|---|
| 8,823,486 B2 * | 9/2014 | Jung ...................... | B60L 53/16 340/5.6 |
| 9,685,734 B1 | 6/2017 | Nugent, Jr. | |
| 2004/0192092 A1 * | 9/2004 | Borrego Bel .......... | H01R 13/53 439/181 |
| 2014/0021915 A1 | 1/2014 | Staley et al. | |
| 2015/0344014 A1 * | 12/2015 | Knechtges ............ | B60T 13/745 701/70 |

(Continued)

FOREIGN PATENT DOCUMENTS

| | | |
|---|---|---|
| EP | 3 309 908 A2 | 4/2018 |
| WO | 2018/083287 A1 | 5/2018 |

OTHER PUBLICATIONS

FR Search Report, dated Jun. 25, 2019, from corresponding FR application No. 18 59288.

*Primary Examiner* — Abdullah A Riyami
*Assistant Examiner* — Nelson R. Burgos-Guntin
(74) *Attorney, Agent, or Firm* — Nixon & Vanderhye

(57) ABSTRACT

The disclosed device equips a connection unit including a connector, on the cable side of the recharging station, and a socket, on the electric vehicle side. It includes an active part mounted on an element from among the connector and the socket, and a passive part mounted on the other element, the active part including an actuator and a plurality of rods forming plungers capable of being translated by the actuator to bear on the passive part of the decoupling device so as to generate a force in order to separate the connector from the socket.

15 Claims, 3 Drawing Sheets

(56) References Cited

U.S. PATENT DOCUMENTS

2018/0201145 A1     7/2018   Yellambalase et al.
2020/0112127 A1*   4/2020   Chagny ................ H01R 13/635

* cited by examiner

DEVICE FOR AUTOMATICALLY DECOUPLING A CONNECTOR INSERTED IN A SOCKET OF AN ELECTRIC VEHICLE

BACKGROUND OF THE INVENTION

Field of the Invention

The invention relates to the field of electric vehicles, and more particularly that of means for recharging an electric vehicle with a fixed recharging station.

Description of the Related Art

It is known to recharge the energy storage means on board an electric vehicle (such as the batteries or supercapacitors) by direct connection to a fixed recharging station on the ground, using a power cable.

The free end of the cable is provided with a connector intended to be inserted into a conjugated socket, with which the electric vehicle is provided.

Standard IEC 62196 thus defines the general characteristics of the connectors (male part) and socket (female part) of the connection means for the recharging of electric vehicles from a recharging station.

Recharging by cable requires the intervention of an operator (for example the driver of the electric vehicle) both to connect the cable to the electric vehicle, that is to say, to insert the connector into the socket before recharging, and to disconnect the cable, that is to say, to decouple the connector from the socket at the end of the recharging.

Yet it is tedious to have to disconnect the cable manually, in particular once the batteries of the electric vehicle are recharged and the vehicle can leave again. The driver who is waiting inside his vehicle for recharging to finish would like not to have to exit the vehicle again to disconnect the cable when he wishes to leave.

SUMMARY OF THE INVENTION

The invention therefore aims to resolve this problem.

To that end, the invention relates to a device for automatically decoupling means for connecting an electric vehicle to a recharging station by cable, the connection means including a connector, on the cable side of the recharging station, and a socket, on the electric vehicle side, the decoupling device including an active part mounted on an element from among the connector and the socket, and a passive part mounted on the other element, the active part including an actuator and a plurality of rods forming plungers capable of being translated by the actuator to bear on the passive part of the decoupling device so as to generate a force in order to separate the connector from the socket.

According to specific embodiments, the device includes one or more of the following features, considered alone or according to any technically possible combinations:
  the passive and active parts are capable of being fastened on a standard connector and/or a standard socket.
  the actuator of the active part is capable of being triggered remotely.

BRIEF DESCRIPTION OF THE DRAWINGS

The invention and its advantages will be better understood upon reading the following detailed description of to specific embodiments, provided solely as illustrative and non-limiting examples, the description being done in reference to the appended drawings, in which.

DESCRIPTION OF THE PREFERRED EMBODIMENTS

Figure 1:
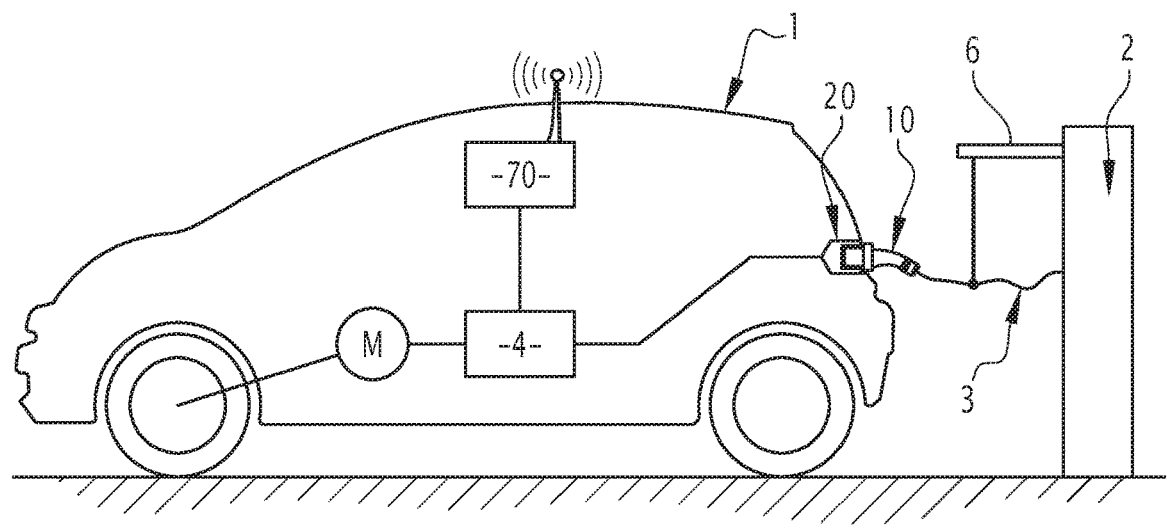
FIG. 1 is a general illustration of an electric vehicle connected by a cable to a recharging station.

In reference to FIG. 1, an electric vehicle 1 is parked near a recharging station 2 such that a power cable 3, belonging to the recharging station 2, can be connected on the electric vehicle 1 so as to allow the recharging of the energy storage means on board the vehicle 1 (such as batteries 4). The batteries 4 make it possible to power the traction means of the electric vehicle 1, such as an electric motor M.

More specifically, the free end of the cable 3 is provided with a connection means capable of being coupled with a conjugated connection means provided on the body of the electric vehicle 1.

For example, in the embodiment shown in the figures, the free end of the cable 3 is provided with a connector 10 intended to be inserted into a socket 20 provided on the electric vehicle 1. Preferably, according to the standards in force for recharging electric vehicles, the connector 10 is of the male type and the socket 20 is of the female type.

According to the invention, the connection means are equipped with a device that, when it is actuated, makes it possible to decouple the connector 10 from the socket 20 automatically.

It should be noted that, to prevent the connector 10 from falling on the ground once it is decoupled from the socket 20, the recharging station 3 is advantageously equipped with a beam 6 from which the cable 3 is suspended.

According to the invention, the decoupling device is mounted on the connection means, but is not integrated into the male socket-female socket assembly. In other words, according to the invention, the decoupling device is attached on the connection means and is not a part thereof.

In a first embodiment shown in FIGS. 2 to 5, the decoupling device includes a passive part 30, on the connector 10 side, and an active part 40, on the socket 20 side.

Figure 3:
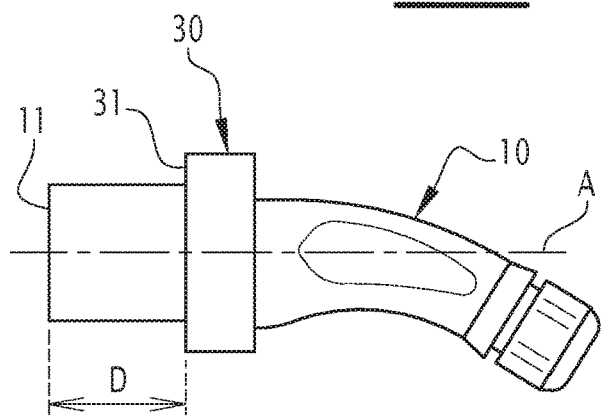
FIGS. 2 and 3 show, in front view and in side view, respectively, the connector-side part of a device according to a first embodiment of the invention.
Figure 2:
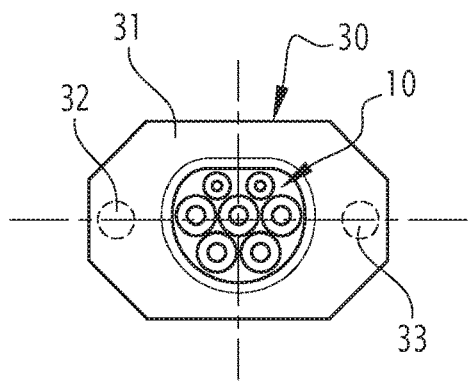

More specifically, as shown in FIGS. 2 and 3, the passive part 30 is made up of a ring, mounted on the connector 10. The passive part 30 has a planar front surface 31, perpendicular to the axis A of the connector 10 and oriented toward the socket 20 in the coupled position of the connector on the socket. The front surface 31 is withdrawn by a distance D from the front surface 11 of the connector 10. The front surface 31 delimits bearing zones 32, 33 on either side of the connector 10.

Figure 4:
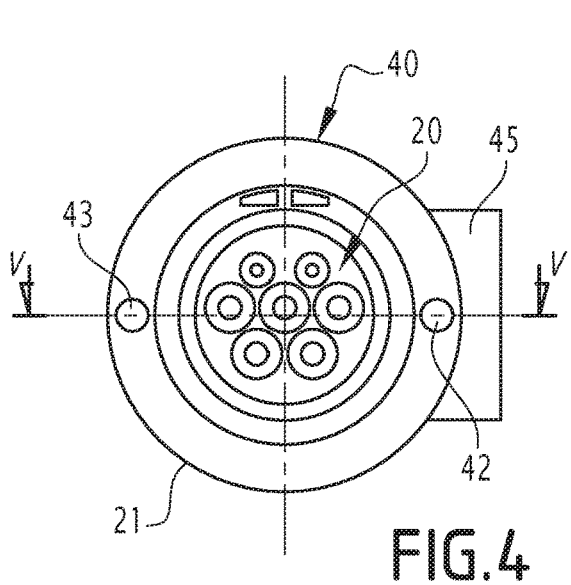
FIGS. 4 and 5 show, in front view and in axial cross-sectional view, respectively, the electric vehicle-side part of the device according to the first embodiment of the invention.
Figure 5:
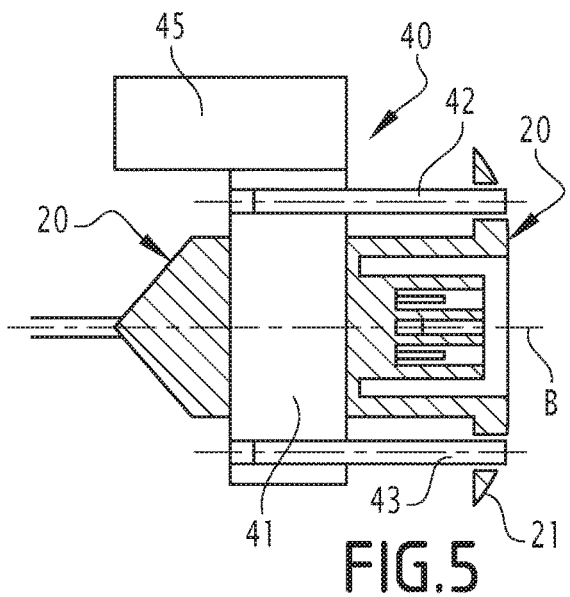

As shown in FIGS. 4 and 5, the active part 40 of the device is made up of a body 41, mounted on the socket 20 so as to grip it.

The active part 40 includes an actuator 45, which is mounted secured to the body 41.

The body 41 is made from a plurality of rods forming plungers. The rods are arranged symmetrically and regularly at the periphery of the socket 20. In FIGS. 3 and 4, the body 41 includes two rods 42 and 43.

The rods 42 and 43 are mounted parallel to the axis B of the socket 20. They are mounted translatably relative to the body 41.

The rods 42 and 43 are set in motion by the actuator 45 when the latter is triggered. They then move in translation parallel to the axis B.

The rods can thus go from a withdrawn position to a deployed position. In the withdrawn portion, the end of the rods does not protrude past the collar 21 defining the front face of the socket 20. In the deployed position, the end of the rods protrudes past the collar 21, preferably by a distance D.

While the connector 10 is coupled to the socket 20, the end of the rods 42 and 43 is capable of coming into contact with the surface 31 of the ring carried by the connector 10 and applying a pressure on the zones 32 and 33, respectively.

The force applied by the rods on the passive part of the decoupling device during their movement makes it possible to remove the connector 10 from the socket 20.

Once the connector 10 is decoupled from the socket 20, the rods 42 and 43 are preferably retracted past the front face of the socket 20, in particular to allow the coupling of a connector for the next recharge.

Figure 7:
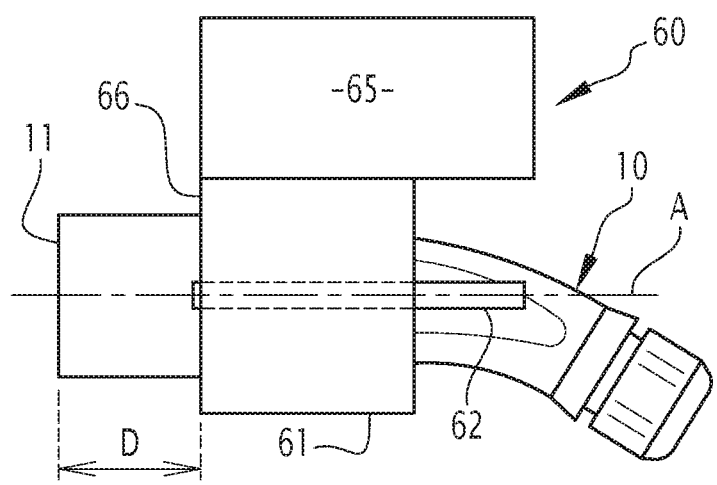
Figure 8:
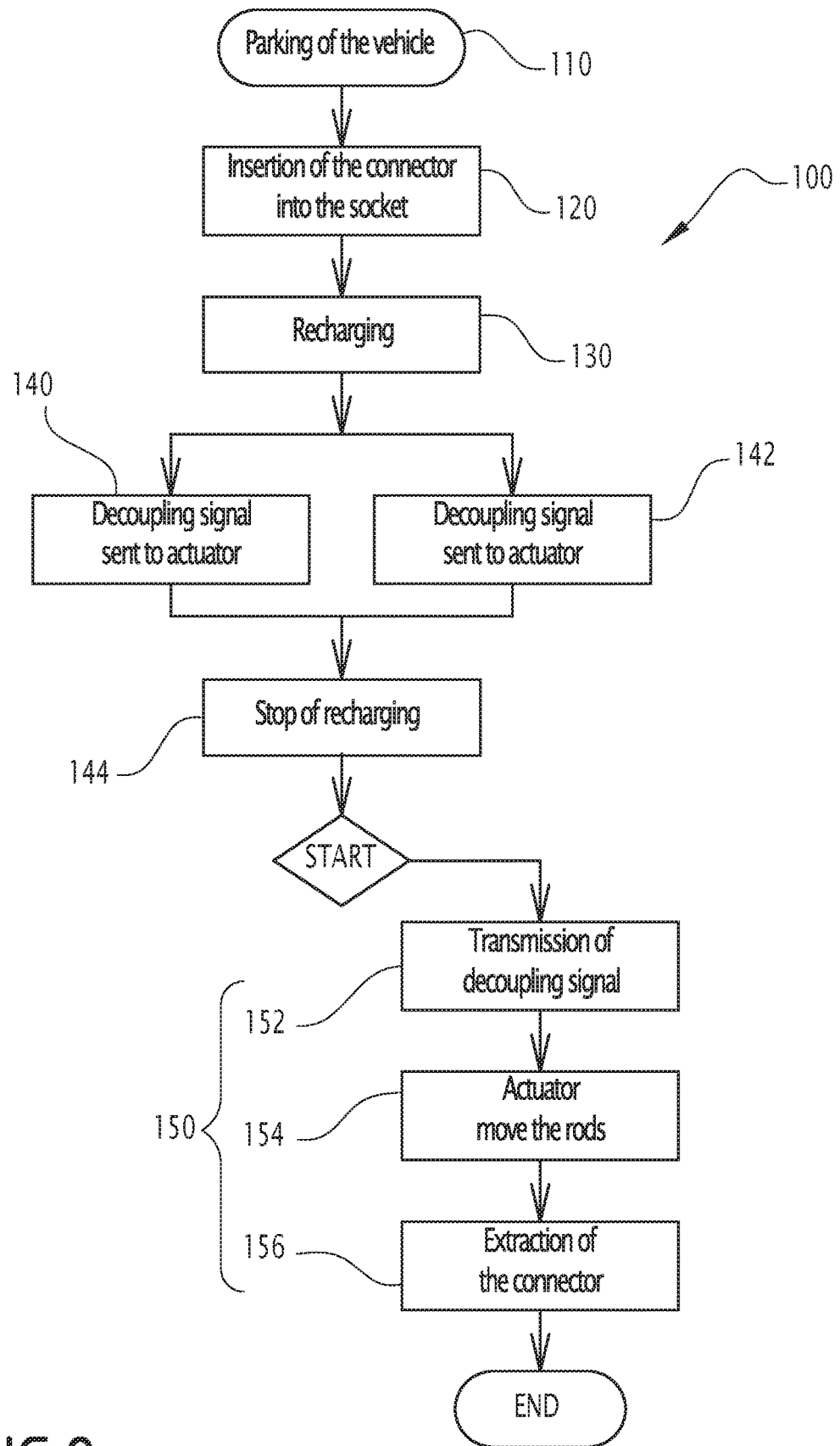
FIG. 8 is a block diagram of a method for using a device according to the invention.

In reference now to FIGS. 7 and 8, a second embodiment of the decoupling device according to the invention will be described, in which the active part 60 is on the connector side 10, while the passive part is on the socket side 20.

The active part 60 includes a body 61 forming a ring around the connector 10 and an actuator 65 secured to the body 61.

The body 61 includes rods, for example two rods 62 and 63.

These rods, the axis of which is parallel to the axis A of the connector 10, are mounted on the body 61 so as to be translatable along the axis A.

The rods are translated by the actuator 65 between a withdrawn position and a deployed position. In the withdrawn portion, the end of the rods 62, 63 does not protrude past the front surface 66 of the body 60. In the deployed position, the end of the rods protrudes past the front face 66, for example by a distance D making it possible to guarantee the complete removal of the connector 10 outside the socket 20.

On the socket 20 side, the passive part of the device is preferably simply made up of the collar defining the periphery of the front face of the socket 20. This collar makes up a bearing surface for the rods with which the active part 60 is provided.

Thus, the actuator 65 is able, when it is controlled, to move the rods 62 and 63 in translation such that their ends bear on the passive part of the device and generate, on the connector 10, a reaction force making it possible to remove the connector 10 from the socket 20.

To control the actuator, a control unit 70 is provided on board the vehicle 1.

Advantageously, the control unit 70 is connected to the battery 4 so as to determine the charge state thereof. When the device 70 determines that the charge state of the battery 4 is above a predetermined threshold, for example 95% of the maximum charge that the battery can store, the control unit 70 transmits a decoupling signal to the decoupling device so as to command the automatic disconnection of the connection means.

Figure 6:
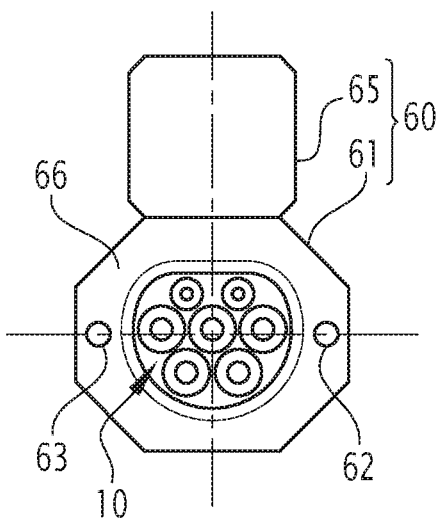
FIGS. 6 and 7 show, in front view and in side view, respectively, the connector-side part of a device according to a second embodiment of the invention.

Advantageously, the connection between the control unit 70 and the decoupling device is a wireless connection having the advantage of allowing remote triggering of the decoupling device. Such a wireless connection is in particular useful in the case where the actuator is not positioned on the vehicle as illustrated by the embodiment of FIGS. 6 and 7. In the case of an embodiment in which the actuator is positioned on the vehicle, embodiment illustrated in FIGS. 2 to 5, the unit 70 preferably controls the actuator 45 directly, for example through a dedicated wired connection.

In reference to FIG. 8, the implementation of the decoupling device of FIGS. 6 and 7 will be described.

In step 110, the driver of the electric vehicle 1 parks his vehicle in the immediate vicinity of a recharging station 3 in order to recharge the batteries 4 of the vehicle 1.

In step 120, the driver, who has exited the vehicle 1, grasps the connector 10 equipping the end of the cable 3 of the recharging station 1 and inserts it into the socket 20 with which the vehicle 1 is equipped.

Once the electrical connection is established between the vehicle 1 and the recharging station 3, the recharging of the energy storage means can begin (step 130).

In step 140, it is detected that the batteries 4 are recharged and the control unit 70 transmits a decoupling signal to the actuator 65.

In a variant, the driver, deeming that the recharging of the energy storage means is sufficient, controls the control unit 70 so that it transmits the decoupling signal.

In step 144, the recharging of the batteries 4 is stopped by in particular placing the recharging station 3 in a secure position.

In step 150, the decoupling method strictly speaking is implemented.

In step 152, the unit 70 transmits the decoupling signal.

In step 154, upon receiving this decoupling signal, the actuator 65 is triggered so as to translate the rods 62 and 63 forming plungers and take them from the withdrawn position to the deployed position.

In step 156, the moving rods bear on the passive part of the device so as to extract the connector 10 from the socket 20.

After a certain actuating duration corresponding to a maximum journey of the rods, the connector 10 is decoupled from the socket 20. Advantageously, the actual performance of the decoupling can be confirmed by the analysis of the signals present on the connector 20 on the vehicle side.

Advantageously, the actuator 65 is triggered so as to translate the rods 62 and 63 from the deployed position to the withdrawn position.

The decoupling is therefore finished and the vehicle is mechanically independent from the cable 3. The vehicle 1 can therefore leave.

One skilled in the art will note that the device that has been described above constitutes a disconnection system with a low cost, since it adapts easily to the existing connectors and sockets.

This decoupling device makes it possible to disconnect the recharging cable of an electric vehicle (autonomous or with a driver) in a motorized manner and without operator intervention.

In the embodiments described above, it has been described that the mechanical means making it possible to remove the connector from the socket are made up of a plunger-forming rod. However, in a variant, any mechanical means making it possible to separate the connector from the socket can be implemented.

The invention claimed is:

1. A decoupling device for automatically decoupling a means for connecting an electric vehicle (1) to a recharging station (2) by cable (3), the connection means including a connector (10), on the cable side of the recharging station, and a socket (20), on the electric vehicle side, the decoupling device comprising:
    an active part (40; 60) mounted on an element from among the connector and the socket, and
    a passive part (30) mounted on the other element from among the connector and the socket,
    the active part including an actuator (45; 65) and a plurality of rods (42, 43; 62, 63) forming plungers translatable by the actuator to bear on the passive part, the plungers bearing on the passive part generating a force which separates the connector (10) from the socket (20).

2. The decoupling device according to claim 1, wherein the passive part (30) is made up of a ring mounted on the connector (10), and the active part (40) is made up of a body (41) mounted on the socket (20) so as to grip the socket (20).

3. The decoupling device according to claim 1, wherein the active part (60) includes a body (61) forming a ring around the connector (10), and the passive part is made up of a collar defining a periphery of a front face of the socket (20).

4. The decoupling device according to claim 1, wherein the actuator of the active part (40; 60) is triggered when a decoupling signal is received that is emitted by a control unit (70).

5. The decoupling device according to claim 4, wherein a connection between the control unit (70) and the decoupling device is a wireless connection.

6. The decoupling device according to claim 2, wherein the actuator of the active part (40; 60) is triggered when a decoupling signal is received that is emitted by a control unit (70).

7. The decoupling device according to claim 3, wherein the actuator of the active part (40; 60) is triggered when a decoupling signal is received that is emitted by a control unit (70).

8. The decoupling device according to claim 6, wherein a connection between the control unit (70) and the decoupling device is a wireless connection.

9. The decoupling device according to claim 7, wherein a connection between the control unit (70) and the decoupling device is a wireless connection.

10. The decoupling device according to claim 1, wherein,
    the passive part (30) comprises a ring mounted on the connector (10), the ring having a surface (31) delimiting bearing zones (32, 33),
    the active part (40) comprises a body (41) mounted on the socket (20) so as to grip the socket (20),
    the body (41) comprises the plurality of rods forming the plungers, the plurality of rods being arranged at a periphery of the socket (20),
    the plurality of rods being mounted translatably relative to the body (41),
    the plurality of rods are set in motion, by the actuator (45) being triggered, to move in translation relative to an axis (B) of the socket (20) from a withdrawn position to a deployed position where an end of the plurality of rods protrudes past the collar (21) so that with the connector (10) being coupled to the socket (20), the end of the plurality rods come into contact with the bearing zones (32, 33) of the surface (31) of the ring mounted on the connector (10) thereby applying a pressure on the bearing zones (32, 33), the pressure on the bearing zones (32, 33) providing the force which separates the connector (10) from the socket (20).

11. The decoupling device according to claim 1, wherein,
    the passive part (30) comprises a collar defining a periphery of a front face of the socket (20), the collar including a bearing surface,
    the active part (60) comprises a body (61) forming a ring around the connector (10), the actuator (65) being secured to the body (61), the body (60) having a front surface (66),
    the plurality of rods forming the plungers are mounted on the body (61) and are translatable along the axis (A) relative to the body (61), and
    the plurality of rods are set in motion, by the actuator (65) being triggered, to move in translation relative to an axis (A) of the body (65) from a withdrawn position to a deployed position where an end of the plurality of rods protrudes past the front surface (66) of the body (60) so that with the connector (10) being coupled to the socket (20), the end of the plurality rods come into contact with the bearing surface of the collar thereby applying a pressure on the bearing surface, the pressure on the bearing surface providing the force which separates the connector (10) from the socket (20).

12. The decoupling device according to claim 10, further comprising a control unit (70) that sends a decoupling signal to the actuator, the actuator being triggered by reception of the decoupling signal.

13. The decoupling device according to claim 12, wherein a connection between the control unit (70) and the decoupling device is a wireless connection.

14. The decoupling device according to claim 11, further comprising a control unit (70) that sends a decoupling signal to the actuator, the actuator being triggered by reception of the decoupling signal.

15. The decoupling device according to claim 14, wherein a connection between the control unit (70) and the decoupling device is a wireless connection.

* * * * *